No. 627,344. Patented June 20, 1899.
T. MARONEY.
ARTIFICIAL FISH OR BAIT.
(Application filed Sept. 17, 1898.)

(No Model.)

Witnesses
Harry L. Amer,
A. Evans

Inventor
Thomas Maroney,
by V. S. Stockbridge
his Attorney.

UNITED STATES PATENT OFFICE.

THOMAS MARONEY, OF BUFFALO, NEW YORK.

ARTIFICIAL FISH OR BAIT.

SPECIFICATION forming part of Letters Patent No. 627,344, dated June 20, 1899

Application filed September 17, 1898. Serial No. 691,182. (No model.)

*To all whom it may concern:*

Be it known that I, THOMAS MARONEY, a citizen of the United States, residing at Buffalo, in the county of Erie and State of New York, have invented certain new and useful Improvements in Artificial Fish or Bait; and I do hereby declare the following to be a full, clear, and exact description of the invention, such as will enable others skilled in the art to which it appertains to make and use the same.

My invention relates to artificial fish for trolling purposes, and is designed for the production of a fish which may be used in grass or seaweed without danger of catching the hooks carried thereby in the weeds.

The invention consists in certain features of construction and combinations of parts, which will be hereinafter more fully described and claimed.

Figure 1:
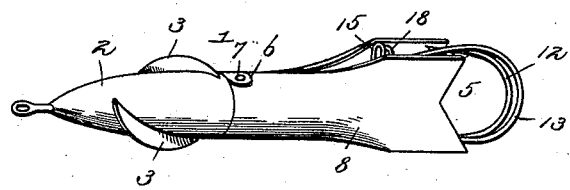
Figure 2:
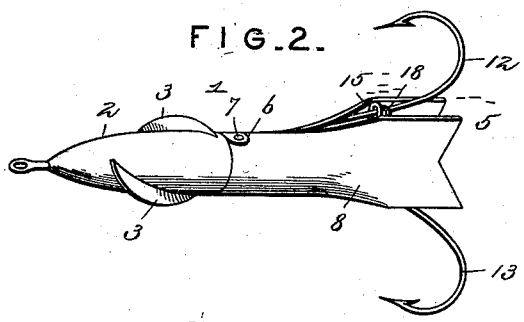
Figure 3:
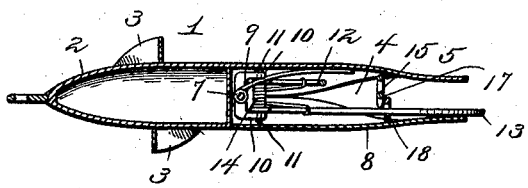
Figure 4:
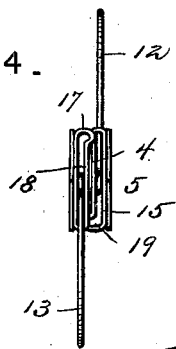
Figure 5:
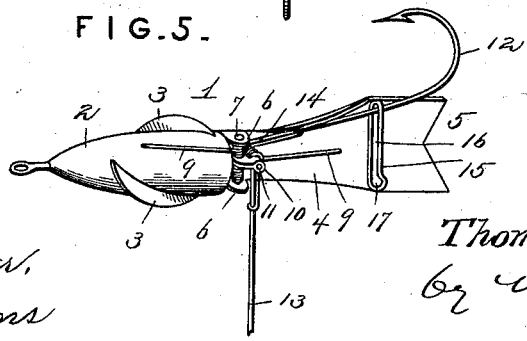

In the drawings forming a part of this specification, Figure 1 represents a perspective view of my improved artificial fish or bait, showing the hooks in their normal positions locked within the hollow body. Fig. 2 is a similar view of the same with the hooks in their outer positions. Fig. 3 is a longitudinal section taken on a plane at right angles to the plane of the hooks. Fig. 4 is a rear end view of the fish with the hooks in their outer positions. Fig. 5 is a perspective view of the fish or bait with the pivoted section at the rear thereof removed.

Like reference-numerals indicate like parts in the different views.

The body 1 of my improved artificial fish or bait is formed with a hollow inclosed head 2 at its forward end, upon which are spirally-arranged fins 3 3, provided for the purpose of causing a rotary movement to be imparted to the fish in its passage through the water. The hollow head serves to make the fish more buoyant, and thereby enable it to be drawn forward at a point adjacent to the surface of the water. Formed integral with the head is a rearwardly-extending hollow portion 4 of the body, which terminates in a tail 5 and forming one of the tailpieces. Extending through the ears 6, which are formed upon the hollow portion 4, is a pin 7, upon which is mounted a pivoted section 8, the counterpart of the extension 4, as clearly shown in the drawings. The pivoted section 8 is normally urged outwardly by means of a spring 9, which is coiled upon the pin 7 and has its terminals engaging the inner surface of the extension 4 and the pivoted section 8, respectively. Secured to the pin 7 at a point intermediate of its ends are lugs 10 10, through the ends of which extends a pin 11, which is located at right angles to the pin 7 heretofore referred to. Upon the pin 11 are pivoted two hooks 12 and 13, which are normally urged outwardly by means of a coil-spring 14, wound upon the pin 11 and having its terminals secured, respectively, to said hooks. The hook 12 fits and moves within a guide-loop 15, secured to the inner surface of the extension 4 adjacent to the tail 5, the said guide being preferably constructed of wire and having a loop at one end, which forms a shoulder 17, against which said hook is adapted to bear. A similar guide-loop 18 is secured to the pivoted section 8 adjacent to its rear end, having a similar loop or eye 19 at the end opposite that in which the loop or eye 16 is formed on the guide 15, within which is adapted to fit and move the other hook 13. By this construction it will be seen that by forcing the hooks 12 and 13 inwardly against the pressure of the spring 14 said hooks may be locked within the hollow portion of the fish or bait, so that no portion thereof projects. The guide-loop 18 on the pivoted section 8 is located slightly in advance of the guide-loop 15 on the extension 4, so that by compressing the pivoted section 8 the hooks 12 and 13 may be released from engagement with the shoulders on said guide-loops, and thereby caused to be thrust outwardly through the action of the spring 14.

In operation the artificial bait is attached to the end of a fish-line in the ordinary manner, and the hooks are caused to assume their inward positions, as shown in Fig. 1 of the drawings. During the forward movement of the line the rotation of the fish will be caused through the agency of the spirally-arranged fins 3 3, and the engaging portions of the hooks will be so protected that no grasses or weeds within the water can become attached thereto. The outer surface of the bait being polished or painted, the rotation thereof will cause the rays of light to be reflected and attract the live fish thereto. When the bait is grasped by a live fish, the pivoted section 8 is forced inwardly, simultaneously tripping or releasing the hooks 12 and 13, throwing the latter outwardly, and causing the same to engage the mouth of the fish taking the bait. It will thus be seen that the rotation of the bait will be uninterrupted by reason of the attachment thereto of weeds or other foreign matter within the water and that its progress will be unimpeded by reason of the complete inclosure of the engaging portions of the hook. At the same time when the bait is grasped by a live fish the hooks will be instantly thrown into operative position for catching the fish.

Having thus described the invention, what I claim as new, and desire to secure by Letters Patent, is—

1. An artificial fish or bait, comprising a hollow hermetically-sealed forward portion of pointed cylindrical form, spaced tailpieces extending rearward therefrom, a spiral fin on the outside of the hollow forward portion, and spring-actuated hooks arranged to fold between the tailpieces.

2. An artificial fish or bait having a hollow body comprising relatively-movable tailpieces, outwardly-spring-pressed hooks therein, means on the tailpieces for locking said hooks within said body, and hook tripping or releasing mechanism on said tailpieces.

3. An artificial fish or bait having a hollow extension at its rear end on one side, a hollow pivotally-mounted section on the opposite side, a spring for normally urging said section outwardly, stops or shoulders for the hooks on said extension and section respectively, and pivotally mounted, outwardly-spring-pressed hooks adapted to be engaged and held by said stops or shoulders in their inward positions and adapted to be released or tripped by the compression of said pivoted section.

4. An artificial fish or bait having a hollow extension at its rear end upon one side, a guide-loop terminating in an eye at one end forming a shoulder secured to said extension at a point adjacent to its rear end, a hollow pivoted section opposite said extension, a guide-loop terminating in an eye forming a shoulder secured to said section at a point adjacent to its rear end and lying in a different plane from the guide-loop on said extension, and pivotally-mounted, outwardly-spring-pressed hooks adapted respectively to fit and move within the guides on said extension and section and to engage the shoulders at the ends thereof.

In testimony whereof I affix my signature in presence of two witnesses.

THOMAS MARONEY.

Witnesses:
JAMES CLOSSEY,
F. SOWA.